United States Patent
Deplan

(10) Patent No.: US 9,816,652 B2
(45) Date of Patent: Nov. 14, 2017

(54) LOCK FOR A TUBULAR CONNECTION

(71) Applicant: A. RAYMOND ET CIE, Grenoble (FR)

(72) Inventor: Anaïs Deplan, Echirolles (FR)

(73) Assignee: A. RAYMOND ET CIE, Grenoble (FR)

( * ) Notice: Subject to any disclaimer, the term of this patent is extended or adjusted under 35 U.S.C. 154(b) by 44 days.

(21) Appl. No.: 14/783,954

(22) PCT Filed: Apr. 14, 2014

(86) PCT No.: PCT/FR2014/050900
§ 371 (c)(1),
(2) Date: Oct. 12, 2015

(87) PCT Pub. No.: WO2014/170590
PCT Pub. Date: Oct. 23, 2014

(65) Prior Publication Data
US 2016/0053930 A1 Feb. 25, 2016

(30) Foreign Application Priority Data
Apr. 17, 2013 (FR) .................................... 13 53466

(51) Int. Cl.
*F16L 37/08* (2006.01)
*F16L 37/084* (2006.01)
*F16L 37/098* (2006.01)

(52) U.S. Cl.
CPC ....... *F16L 37/0841* (2013.01); *F16L 37/0985* (2013.01)

(58) Field of Classification Search
CPC ....... F16L 37/04; F16L 37/086; F16L 37/084; F16L 37/0987

(Continued)

(56) References Cited

U.S. PATENT DOCUMENTS 5,228,728 A * 7/1993 McNaughton ...... F16L 37/0982
                                                    285/319
5,257,833 A * 11/1993 McNaughton ...... F16L 37/0987
                                                    285/319

(Continued)

FOREIGN PATENT DOCUMENTS

DE          19727518 A1    1/1999
DE      102004062207 B3   10/2005

(Continued)

OTHER PUBLICATIONS

Japanese Patent Office Action for Japanese Patent Application No. 2016-508214 dated Jul. 19, 2016.
International Preliminary Report on Patentability.

*Primary Examiner* — David E Bochna
(74) *Attorney, Agent, or Firm* — Dickinson Wright PLLC

(57) ABSTRACT

A lock (10) for a tubular connection, blocked axially in a first tubular element and defining an axial opening (14) receiving a second tubular element provided with a circular collar, said lock (10) comprising elastically deformable cradles provided with inside bevels (13) designed so that, while the second tubular element is axially engaged, they move radially apart under the effect of the axial pressure of the circular collar, allow same to pass through, and then move back in to clamp behind the circular collar and to co-operate therewith to lock the second tubular element axially in the first tubular element. Each cradle (11) is provided with a raised axial ridge (15) with a width (l) less than the width (L) of the cradle (11), and is intended during the axial engagement, to receive the axial thrust from the circular collar. A tubular connector is obtained with such a lock (10).

9 Claims, 3 Drawing Sheets

(58) Field of Classification Search
USPC .................................... 285/305, 308, 319
See application file for complete search history.

(56) References Cited

U.S. PATENT DOCUMENTS

| | | | |
|---|---|---|---|
| 5,374,088 A | 12/1994 | Moretti et al. | |
| 5,485,982 A * | 1/1996 | Gunderson | F16L 37/0987 285/319 |
| 5,486,025 A * | 1/1996 | Ketcham | F16L 37/0987 285/319 |
| 5,518,276 A * | 5/1996 | Gunderson | F16L 37/0987 285/319 |
| 6,086,119 A | 7/2000 | Hänsel | |
| 6,402,204 B1 * | 6/2002 | Stuart | F16L 37/0987 285/319 |
| 2003/0173780 A1 | 9/2003 | Detable et al. | |
| 2013/0008539 A1 | 1/2013 | Kanno et al. | |

FOREIGN PATENT DOCUMENTS

| | | |
|---|---|---|
| DE | 102006030428 A1 | 1/2007 |
| EP | 2497991 A1 | 9/2012 |
| JP | 200512368 A | 9/2000 |
| JP | 2005221074 A | 8/2005 |
| JP | 2011179630 A | 9/2011 |
| WO | 0208656 A1 | 1/2002 |

* cited by examiner

LOCK FOR A TUBULAR CONNECTION

CROSS-REFERENCE TO RELATED APPLICATION

This application is a National Stage of International Application No. PCT/FR2014/050900 filed Apr. 14, 2014 and which claims the benefit and priority of French Patent Application No. FR1353466 filed Apr. 17, 2013. The entire disclosure of each of the above applications is incorporated herein by reference.

TECHNICAL FIELD

The invention relates generally to a locking part for locking a tubular connection, e.g. for connecting together pipes that convey fluid, and to a resulting tubular connector, as used, in particular, in the automobile field, e.g. for connecting a fuel injector, a filter, a radiator, or any other suitable equipment, and/or in any other similar technical field.

PRIOR ART

Such locking parts for locking tubular connections, and such tubular connectors are known, in particular from Publications U.S. Pat. No. 6,086,119 and U.S. Pat. No. 5,374,088, and are shown in FIGS. 1 to 3. Such locking parts 1 are designed to lock a second tubular element 2 in a first tubular element 3 so as to connect them together so as to enable fluid to flow from one to the other.

Each first tubular element 3 is provided with an axial male end-piece 30 that is secured to or integral with a housing 31 provided with an axial orifice 32 provided in axial alignment with the male end-piece 30 of the first tubular element 3. The housing 31 defines a receptacle 33 designed to receive the locking part 1 and provided with side openings 34 allowing the locking part 1 to be inserted from the side, as indicated by arrow T in FIG. 1.

The locking part 1 is generally diamond-shaped, an axial orifice 14 passing through the diamond shape. The sides of the diamond-shape are elastically deformable and they are provided in their middles with cradles 11, and at their ends with press plates 12. Thus, the diamond-shape of the locking part 1 can be flattened to some extent, e.g. for inserting it from the side, through the side openings 34, into the receptacle 33 of the first tubular element 3, as indicated by arrow T in FIG. 1. After being inserted, the locking part 1 relaxes inside the receptacle 33, the press plates 12 then being received in the side openings 34, the cradles 11 projecting both inwards into axial orifice 32 and outwards so as to lock the locking part 1 inside the receptacle 33.

Each second tubular element 2 has an axial male end-piece 20, provided with a circular collar 21, and extended, for example, by a connection flange plate 22. The diameter of the male end-piece 20 of the second tubular element 2 is smaller than the diameters of the male end-piece 30 of the first tubular element 3 and of the axial orifice 14 of the locking part 1, so that it can be received therein. The second tubular element 2 is engaged axially through the locking part 1 into the first tubular element 3. The cradles 11 are provided with inside bevels 13 that are arranged so that, while the second tubular element 2 is being engaged axially into the axial orifice 32, as indicated by the arrow F of FIG. 2, the circular collar 21 pressing axially against the cradles 11 causes the cradles 11 to move radially apart, thereby allowing the circular collar 21 to pass between the cradles 11, and allowing the second tubular element 2 to be inserted into the first tubular element 3. After the circular collar 21 has gone past them, the cradles 11 move radially towards each other, and clamp around the male end-piece 20 of the second tubular element 2 behind the circular collar 21. The cradles 11 then co-operate with the circular collar 21 to lock the second tubular element 2 axially relative to the first tubular element 2, via the locking part 1. A tubular connector is thus obtained as shown in FIG. 3. The first and second tubular elements are also separated by gaskets 23 making it possible to guarantee fluid-tightness. For example, these gaskets 23 are separated axially from each other by an annular spacer 24 and are locked in the first tubular element 3 by means of a ring 25.

In order to guarantee that the tubular connection has good resistance to being pulled apart, the cradles 11 must be strong, which implies that they must be rigid. Therefore, the plug-in forces required for causing the cradles 11 to deform elastically on going over the circular collar 21 are large, making the locking part 1 difficult to use. In addition, in view of the dimensional tolerances of the diameter of the male end-piece 20 of the second tubular element 2, it is frequent for the axial thrust not to be centered relative to each cradle 1. Thus, the axial engagement force to be applied is greater.

SUMMARY OF THE INVENTION

An object of the invention is to remedy that drawback by proposing a locking part for a tubular connection that offers good strength while also requiring only limited plug-in forces.

To this end, the invention provides a locking part for locking a tubular connection, the locking part being designed to be locked axially in a first tubular element and defining an axial orifice designed to receive a second tubular element provided with a circular collar, the locking part being provided with at least one cradle that is elastically deformable and that is provided with an inside bevel that is designed so that, while the second tubular element is being engaged axially into the axial orifice, it moves away radially under the effect of the circular collar pressing axially against it, and allows the circular collar to go past, and it then moves back in to clamp behind the circular collar and to co-operate with the circular collar to lock the second tubular element axially in the first tubular element, said locking part being characterized in that the inside bevel of the cradle is provided with at least one axial ridge extending in relief and of width less than the width of the cradle, and designed so that, during the axial engagement, it receives the axial thrust from the circular collar while avoiding any axial thrust from the circular collar on said cradle outside the axial ridge.

The basic idea of the invention is to provide each cradle with an axial ridge that is suitable for taking up and for concentrating the axial forces, and that is of width smaller than the width of the cradle that carries it. Thus, the friction that is generated is lower, and plugging in is facilitated. In addition, since the axial force is centered by the axial ridges in the midplane of the cradle, for the same axial force, the cradles are easier to move apart.

The locking part of the invention may advantageously have the following features:

the axial ridge extends axially from the inner edge of the inside bevel;

the axial ridge has a width of at least 0.1 millimeters (mm), and the total width of axial ridge(s) does not exceed 50% of the width of the cradle;

at its peak, the profile of the axial ridge has thickness of at least 0.1 mm relative to the profile of the inside bevel of the cradle, the thickness being considered perpendicularly to the surface of the inside bevel;

the axial ridge has thickness that varies along the inside bevel;

the axial ridge has a profile chosen from the group comprising a convex profile, a single-slope profile, and a multi-slope profile;

the axial ridge is a single ridge and is centered in the axial midplane of the cradle;

the cradle is provided with a plurality of axial ridges distributed symmetrically on either side of the axial midplane of the cradle; and the locking part is provided with two cradles that are axially symmetrical to each other.

The invention also provides a tubular connector for connecting together a first tubular element and a second tubular element, which connector includes such a locking part.

BRIEF DESCRIPTION OF THE DRAWINGS

The present invention can be better understood and other advantages appear on reading the following detailed description of embodiments given by way of non-limiting example and with reference to the accompanying drawings, in which.

DESCRIPTION OF EMBODIMENTS

Figure 1:
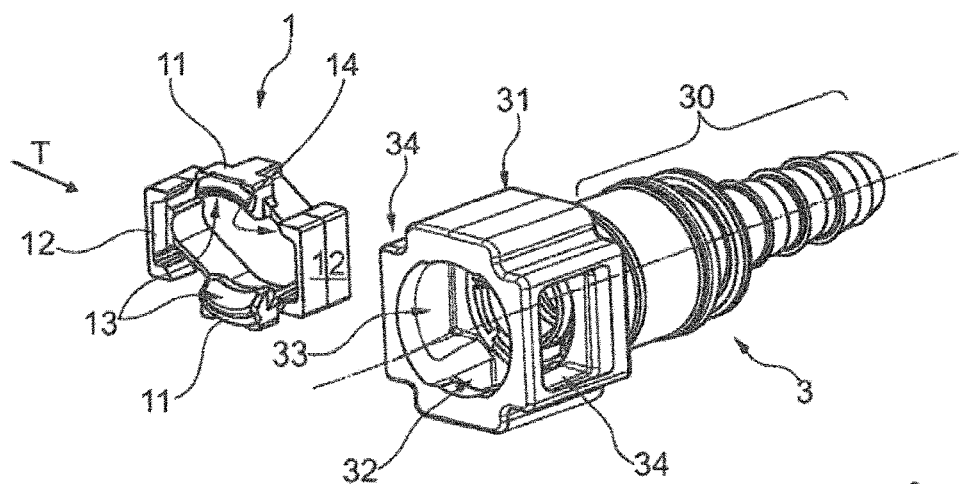
FIGS. 1, 2, and 3 are views respectively in exploded perspective and in section showing a prior art tubular connector, made up of first and second tubular elements and of a locking part, and shown at three distinct stages of engagement.
Figure 2:
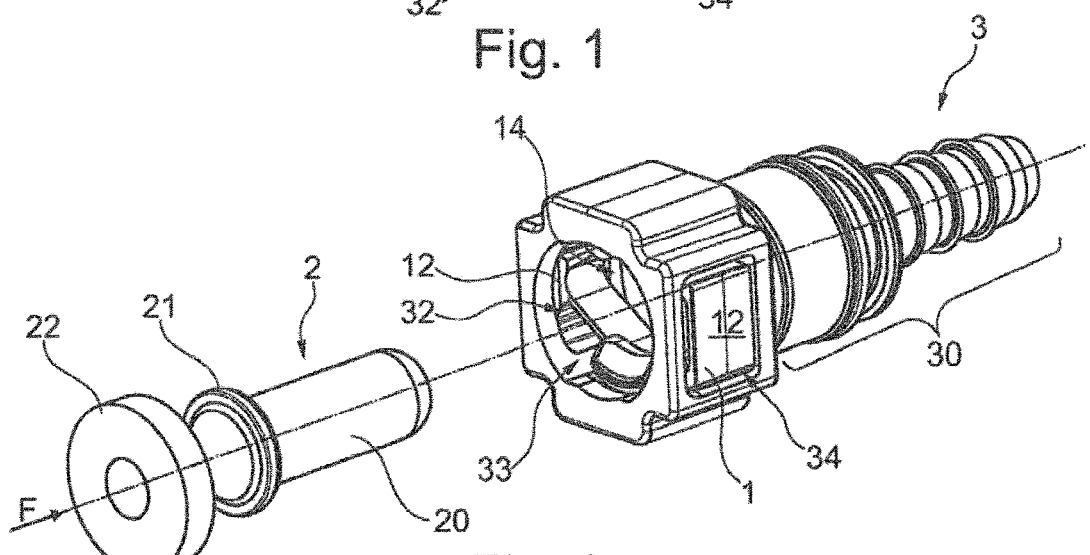
Figure 3:
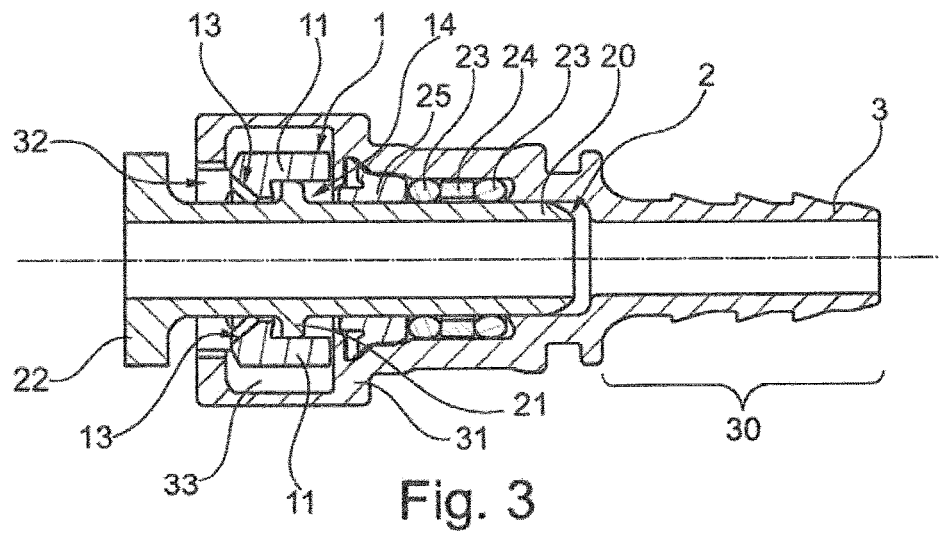
Figure 4:
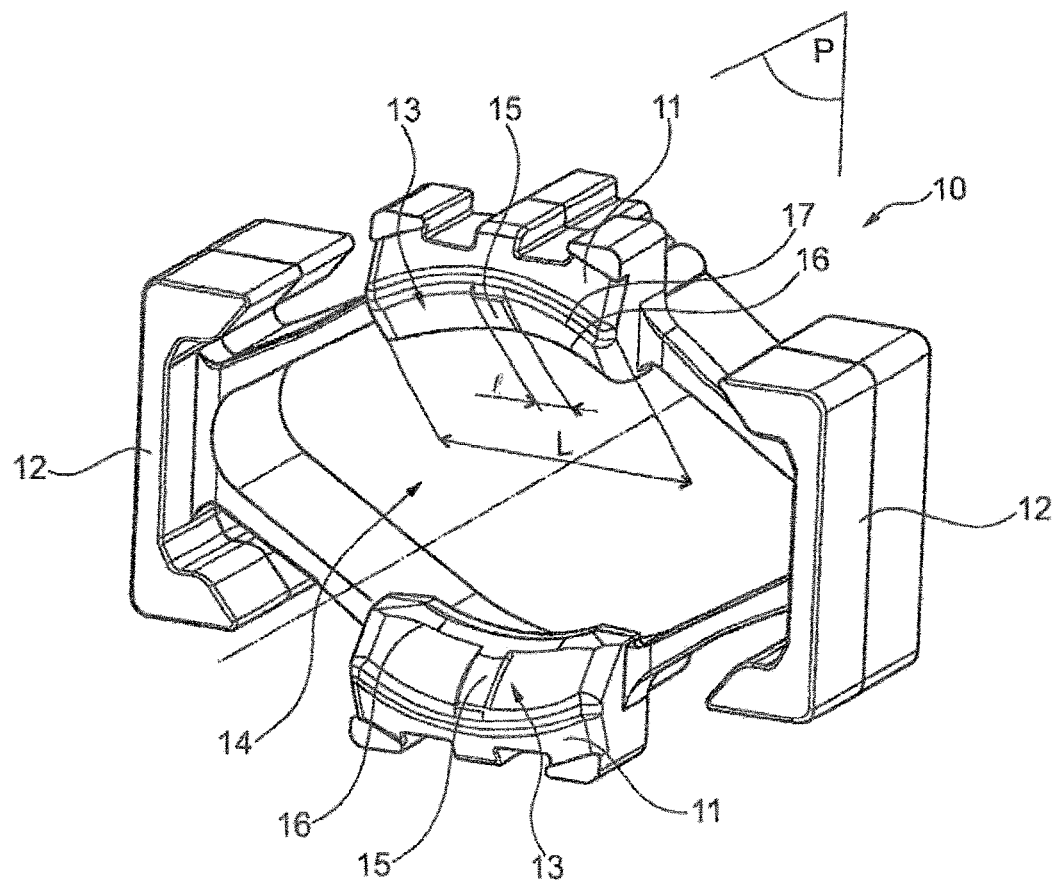
FIG. 4 is a perspective view of a locking part of the invention.

With reference to FIGS. 4 to 9, the locking part 10 of the invention is substantially similar to the locking part 1 shown in FIGS. 1 to 3. Like elements bear like references. Each cradle 11 has an axial ridge 15 provided in the axial midplane P of the corresponding cradle, extending in relief relative to the profile of the inside bevel 13, and extending axially from the inner edge 16 of the inside bevel 13. In the examples shown, the axial ridges 15 extend to the outer edge 17 of the inside bevel 13. However, the axial ridge may be interrupted before reaching said outer edge. Thus, the axial length of the axial ridge 15 is at least 10% of the axial length of the inside bevel 13, starting from the inner edge 16 of the inside bevel 13.

Each axial ridge 15 has a width l less than the width L of the cradle 11 that carries it. The width l is at least 0.1 mm, and is organized such that the total width of the axial ridge 15 does not exceed 50% of the width of the corresponding cradle 11.

Figure 7:
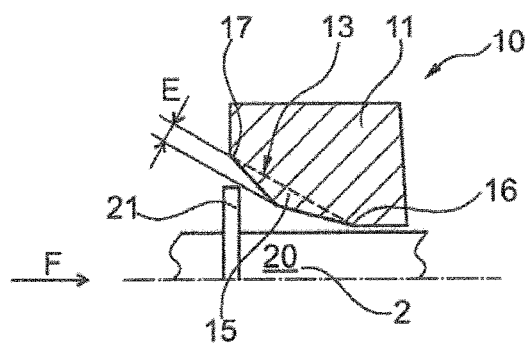
FIGS. 7 to 9 are section views showing three stages of engagement of a second tubular element in the locking part of the invention.

At its peak relative to the profile of the inside bevel 13, each axial ridge 15 has thickness E, shown in FIG. 7, of at least 0.1 mm when said thickness E is considered perpendicularly to the surface of the inside bevel 13.

Figure 5:
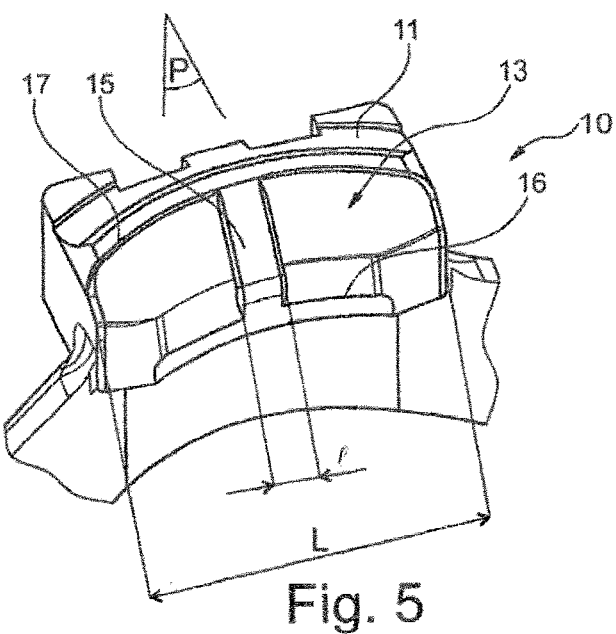
FIGS. 5 and 6 are detail views of two embodiments of a locking part of the invention.
Figure 6:
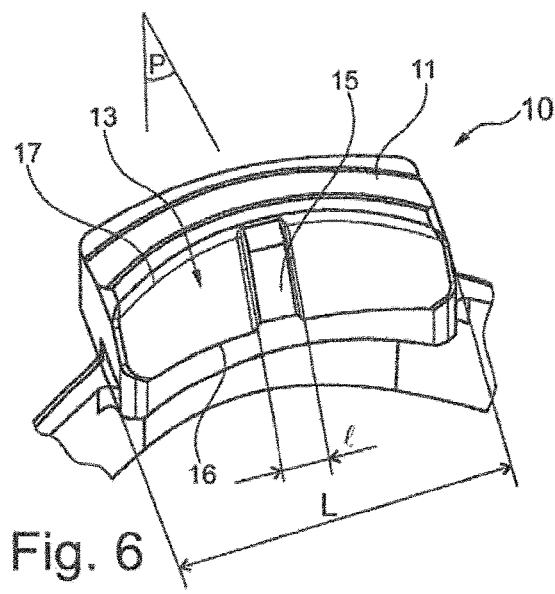

Each axial ridge 15 may be of thickness that varies along the bevel, as shown in FIG. 5, or of thickness that is constant, as shown in FIG. 6. In addition, each axial ridge 15 may have a convex profile, a single-slope profile or a multi-slope profile as shown.

In an embodiment (not shown), the locking part is provided with a plurality of axial ridges. The axial ridges are then distributed symmetrically on either side of the axial midplane of the cradle. The total width of all of the axial ridges of the same cradle does not exceed 50% of the width of said cradle. The axial ridges of the same cradle are separated by a distance that can vary in the range 0.1 mm to one half of the width L of the cradle.

In the examples shown, the locking part has two cradles, each of which is provided with an axial ridge. The locking part may also be provided with a single cradle, or with a plurality of cradles, some of which are not provided with any axial ridge.

Figure 8:
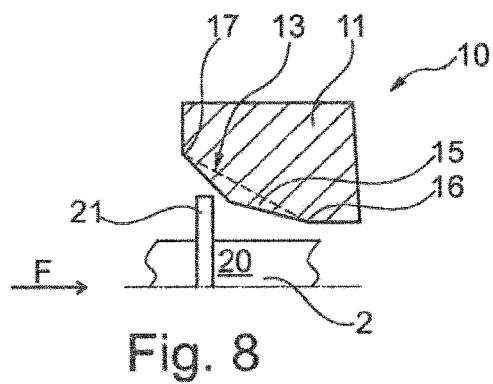
Figure 9:
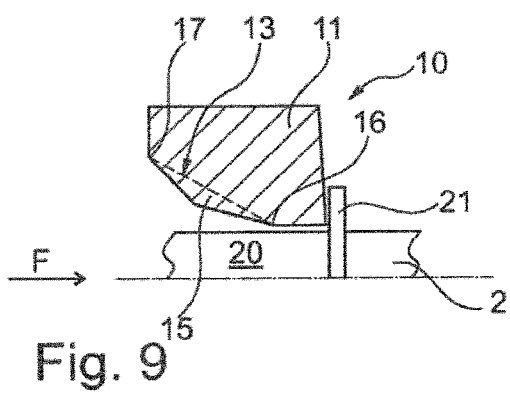

The locking part 10 of the invention may be assembled onto a first tubular element 3 of known type in the same manner as described above for the prior art locking parts 1. While the second tubular element 2 of known type is being axially engaged in the locking part 10 of the invention as indicated by arrow F, as shown in FIGS. 7 to 9, the circular collar 21 of the second tubular element 2 comes into contact with the axial ridge 15. The circular collar 21 is not in contact with the remainder of the surface of the cradle 11. Thus, the axial ridge 15 makes it possible to guarantee that the forces urging the cradles apart 11 are concentrated in the axial midplane P of each cradle 11 and are taken up by the axial ridges 15 only, thereby avoiding any risk of the forces being taken up askew by one or other of the edges of the cradles 11. For the same engagement force, it is thus easier to move the cradles 11 apart. Assembling the tubular connector with a locking part 10 of the invention thus requires a smaller force than with prior art locking parts 1. The invention thus makes it possible to achieve the above-mentioned objectives while maintaining the strength of the locking part 10, and in particular of the cradles, so as to withstand any pulling-apart force, while also facilitating axial plugging in.

Naturally, the present invention is in no way limited to the above description of one of its embodiments, which can undergo modifications without going beyond the ambit of the invention.

The invention claimed is:

1. A locking part (10) for locking a tubular connection, said locking part (10) being designed to be locked axially in a first tubular element (3) and defining an axial orifice (14) designed to receive a second tubular element (2) provided with a circular collar (21), said locking part (10) being provided with at least one cradle (11) that is elastically deformable and that is provided with an inside bevel (13) presenting an inner edge (16) forming a retaining edge and an outer edge (17), said at least one cradle (11) is designed so that, while said second tubular element (2) is being engaged axially into said axial orifice (14), it moves away radially under the effect of said circular collar (21) pressing axially against it, and allows said circular collar (21) to go past, and it then moves back in to clamp behind said circular collar (21) and to co-operate with said circular collar (21) to lock said second tubular element (2) axially behind said retaining edge in said first tubular element (3), wherein said inside bevel (13) of said cradle (11) is provided with at least one axial ridge (15) extending in relief from said inner edge (16) of said inside bevel (13) of said cradle (11) towards said outer edge (17) of said inside bevel (13) of said cradle (11), wherein said at least one axial ridge (15) is of width (l) less than the width (L) of said cradle (11), and designed so that, during said axial engagement, it receives the axial thrust from said circular collar (21) while avoiding any axial thrust from said circular collar (21) on said cradle (11) outside said axial ridge (15).

2. A locking part (10) according to claim 1, wherein said axial ridge (15) has a width (l) of at least 0.1 mm, and in that the total width of axial ridge(s) (15) does not exceed 50% of the width (L) of said cradle (11).

3. A locking part (10) according to claim 1, wherein, at its peak, the profile of said axial ridge (15) has thickness (E) of at least 0.1 mm relative to the profile of said inside bevel (13) of said cradle (11), said thickness (E) being considered perpendicularly to the surface of said inside bevel (13).

4. A locking part (10) according to claim 1, wherein said axial ridge (15) has thickness (E) that varies along said inside bevel (13).

5. A locking part (10) according to claim 1, wherein said axial ridge (15) has a profile chosen from the group comprising a convex profile, a single-slope profile, and a multi-slope profile.

6. A locking part (10) according to claim 1, wherein said axial ridge (15) is a single ridge and is centered in the axial midplane (P) of said cradle (11).

7. A locking part (10) according to claim 1, wherein said cradle (11) is provided with a plurality of axial ridges (15) distributed symmetrically on either side of the axial midplane of said cradle (11).

8. A locking part (10) according to claim 1, wherein it is provided with two cradles (11) that are axially symmetrical to each other.

9. A tubular connector comprising a first tubular element (3) defining an axial orifice (32) designed to receive a second tubular element (2) provided with a circular collar (21), and a locking part (10) locked axially in said first tubular element (3) and provided with at least one cradle (11) that is elastically deformable and that is provided with an inside bevel (13) that is designed so that, while said second tubular element (2) is being engaged axially into said axial orifice (32), it moves away radially under the effect of said circular collar (21) pressing axially against it, and allows said circular collar (21) to go past, and it then moves back in to clamp behind said circular collar (21) and to co-operate with said circular collar (21) to lock said second tubular element (2) axially in said first tubular element (3), and said tubular connector including the locking part (10) according to claim 1.

* * * * *